J. W. STILES.
Pressure-Gages.
No. 6,530. Reissued July 6, 1875.
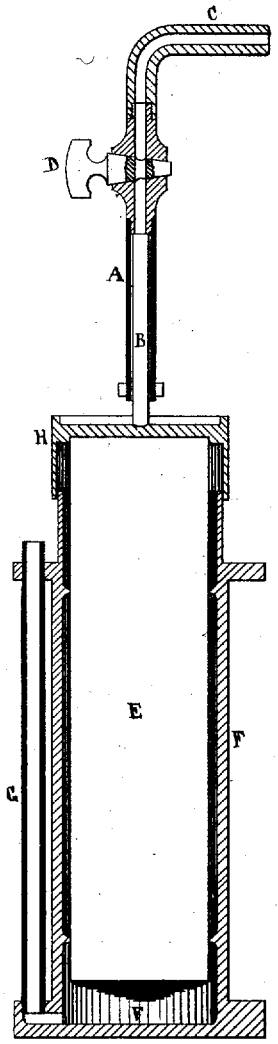
WITNESSES.
A Bell Malcomson Jr.
James G. Hatfield
INVENTOR.
J. W. Stiles
N. PETERS, PHOTO-LITHOGRAPHER, WASHINGTON, D. C.

UNITED STATES PATENT OFFICE.

JOHN W. STILES, OF NEW YORK, N. Y.

IMPROVEMENT IN PRESSURE-GAGES.

Specification forming part of Letters Patent No. 137,331, dated April 1, 1873; reissue No. 6,530, dated July 6, 1875; application filed May 22, 1875.

*To all whom it may concern:*

Be it known that I, JOHN W. STILES, of the city and county of New York and State of New York, have invented a new and Improved Pressure-Gage; and I do hereby declare that the following is a full and clear description thereof, reference being had to the accompanying drawing and to the letters marked thereon.

The nature of my invention consists in causing the pressure of the steam to act upon a vertical float of cylindrical form or uniform size, resting or floating in a reservoir containing mercury or other suitable fluid, and thereby causing the float to displace a greater or less quantity of such fluid exactly equal to the static equivalent of such force or steam-pressure; but to secure this result by a small vertical movement of the float, I confine the mercury or fluid within a tall cylindrical reservoir a little larger in diameter than the float, so as to form a small space around the float, by which arrangement and construction a very small downward or upward movement of the float will cause the fluid to rise or fall in the intermediate space between the float and reservoir, until it stands at a height on the float equal to the immersion of such float in the fluid, thus securing in about half an inch of vertical movement of the float a rise or fall of any desired number of inches of such fluid in the said intermediate space between the float and the reservoir, according to the relative sizes of the parts and the amount of pressure applied to it.

To enable others skilled in the art to make and use my invention, I will now proceed to describe the construction and operation of the same:

In the drawing, A is a small vertical chamber, fitted with the piston or plunger B, and connecting with the steam-boiler by the tube C, the steam being admitted or shut off by a tap, D. This piston or plunger B operates downward, and rests or acts by its lower end on the top of the float E, which is inclosed within the cylindrical reservoir F, which is the sixteenth of an inch, more or less, greater in diameter than the float, thereby forming a small annular space between the float and the reservoir. The top of this float I prefer to make in the form of a cap, and projecting so as to close or cover the annular space. The reservoir F contains mercury, which is preferred for this purpose by reason of its great weight, and for the purpose of indicating the pressure a glass tube, G, may be used, which should be furnished with a graduated scale, as usual in such cases, so as to express the pressure of the steam within the boiler by the height at which the mercury stands in the tube. The piston B is of small diameter or area of cross-section. By this arrangement of my device a considerable pressure of steam upon the piston B will be counterbalanced by comparatively small variation in the column of mercury, for if the piston B has an area of the one-fourth of a square inch, and the float has a sectional area of six square inches, a steam-pressure of ninety-six pounds to the square inch within the boiler would exert a force of twenty-four pounds only on the steam-piston B, which force would be exerted on the float E; but as the float E has six square inches of sectional area, each square inch of its section will have a force of four pounds, and will cause the mercury to rise or fall in the annular space around the float sufficient to balance this pressure, and this variation in height, for convenience, will be assumed at eight inches, at which the height of the mercury in the glass tube G (the graduated scale) would indicate ninety-six pounds, which would be the actual steam-pressure per square inch within the boiler; but if the pressure were twenty-four pounds per square inch upon the boiler the force upon the float E by the piston B would be six pounds, or one pound to the square inch of its sectional area, or equal to a variation of two inches in the column of mercury, according to the previous assumption, which height of mercury in the tube G would indicate twenty-four pounds of steam-pressure in the boiler, and thus the first inch of such a scale would indicate twelve pounds, the second inch twenty-four pounds, the third thirty-six pounds, and so on, at the rate of twelve pounds per inch upon the scale. The graduation of the scale, however, should be determined by the application of the proper pressure to the piston B, and the position of the mercury in the tube G before such pressure is applied should be marked at zero, or the starting-point of the graduated scale.

I have described this apparatus as indicating the pressure of steam by the position of the mercury or weighing-fluid in a glass tube attached to a graduated scale; but it will be readily perceived that the mercury in the reservoir will always be at the same height as that in the tube, and by placing a longitudinal strip of glass in the side of the reservoir the graduated scale may be placed thereon and the tube omitted; or, if preferred, the float E may be made to operate a radial index by a rack and pinion, or other suitable mechanism, in which case the pressure of the steam would be indicated by the position of the index on a circular dial; and other changes may be made in its construction and arrangement without thereby changing its principle.

This apparatus should be accurately made, and the steam-piston and float should be so secured as to work vertically, and in the center line of the reservoir; and where mercury is used as the weighing-medium the material out of which the float and reservoir are made should be such, or so prepared or fortified, as to resist the action of the mercury upon them.

Having thus described my improved steam-gage and its construction and mode of operation, what I claim as new therein, and desire to secure by Letters Patent of the United States, is—

A pressure-gage, having the steam-piston B in combination with a float, E, moving in a chamber containing a weighing-fluid, by the rise and fall of which the amount of pressure is indicated, all operating substantially in the manner and for the purpose shown and described.

J. W. STILES.

Witnesses:

A. BELL MALCOMSON, Jr.,

JAMES G. HETFIELD.